(12) United States Patent
Lee et al.

(10) Patent No.: US 8,503,731 B2
(45) Date of Patent: Aug. 6, 2013

(54) SIGN LANGUAGE RECOGNITION SYSTEM AND METHOD

(75) Inventors: Hou-Hsien Lee, New Taipei (TW); Chang-Jung Lee, New Taipei (TW); Chih-Ping Lo, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 147 days.

(21) Appl. No.: 13/285,024

(22) Filed: Oct. 31, 2011

(65) Prior Publication Data

US 2013/0051614 A1    Feb. 28, 2013

(30) Foreign Application Priority Data

Aug. 23, 2011    (CN) .................. 10 01 30060

(51) Int. Cl.
 *G06K 9/00* (2006.01)
 *G06F 17/28* (2006.01)

(52) U.S. Cl.
 USPC ................ 382/106; 382/154; 704/2

(58) Field of Classification Search
 USPC ............... 382/100, 103, 106–107, 114–117, 382/154, 155, 162, 168, 173, 181, 209, 219, 232, 254, 274, 276, 285–298, 305, 312; 704/2, 704/3, 1, 7; 379/52
 See application file for complete search history.

(56) References Cited

U.S. PATENT DOCUMENTS

| | | | | |
|---|---|---|---|---|
| 5,887,069 A * | 3/1999 | Sakou et al. | .................. | 382/100 |
| 5,953,693 A * | 9/1999 | Sakiyama et al. | ................ | 704/3 |
| 6,477,239 B1 * | 11/2002 | Ohki et al. | ....................... | 379/52 |
| 7,308,112 B2 * | 12/2007 | Fujimura et al. | ............. | 382/103 |
| 8,428,311 B2 * | 4/2013 | Dariush et al. | ................ | 382/115 |
| 2011/0301934 A1 * | 12/2011 | Tardif | ............................... | 704/1 |

* cited by examiner

*Primary Examiner* — Seyed Azarian
(74) *Attorney, Agent, or Firm* — Altis Law Group, Inc.

(57) ABSTRACT

A sign language recognition method includes a depth-sensing camera capturing an image of a gesture of a signer and gathering data about distances between a number of points on the signer and the depth-sensing camera, building a three dimension (3D) model of the gesture, comparing the 3D model of the gesture with a number of 3D models of different gestures to find out the representations of the 3D model of the gesture, and displaying or vocalizing the representations of the 3D model of the gesture.

11 Claims, 4 Drawing Sheets

SIGN LANGUAGE RECOGNITION SYSTEM AND METHOD

CROSS-REFERENCE TO RELATED APPLICATIONS

Relevant subject matter is disclosed in a pending U.S. patent application (application Ser. No. 12/852,512, filed on Aug. 8, 2010) having the same title and assigned to the same assignee as named herein.

BACKGROUND

1. Technical Field

The present disclosure relates to a sign language recognition system and a sign language recognition method.

2. Description of Related Art

Hearing impaired people communicate with other people with sign languages. However, people who do not know sign language find it difficult to communicate with the hearing impaired people. In addition, different countries have different sign languages, which makes communication problematic.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
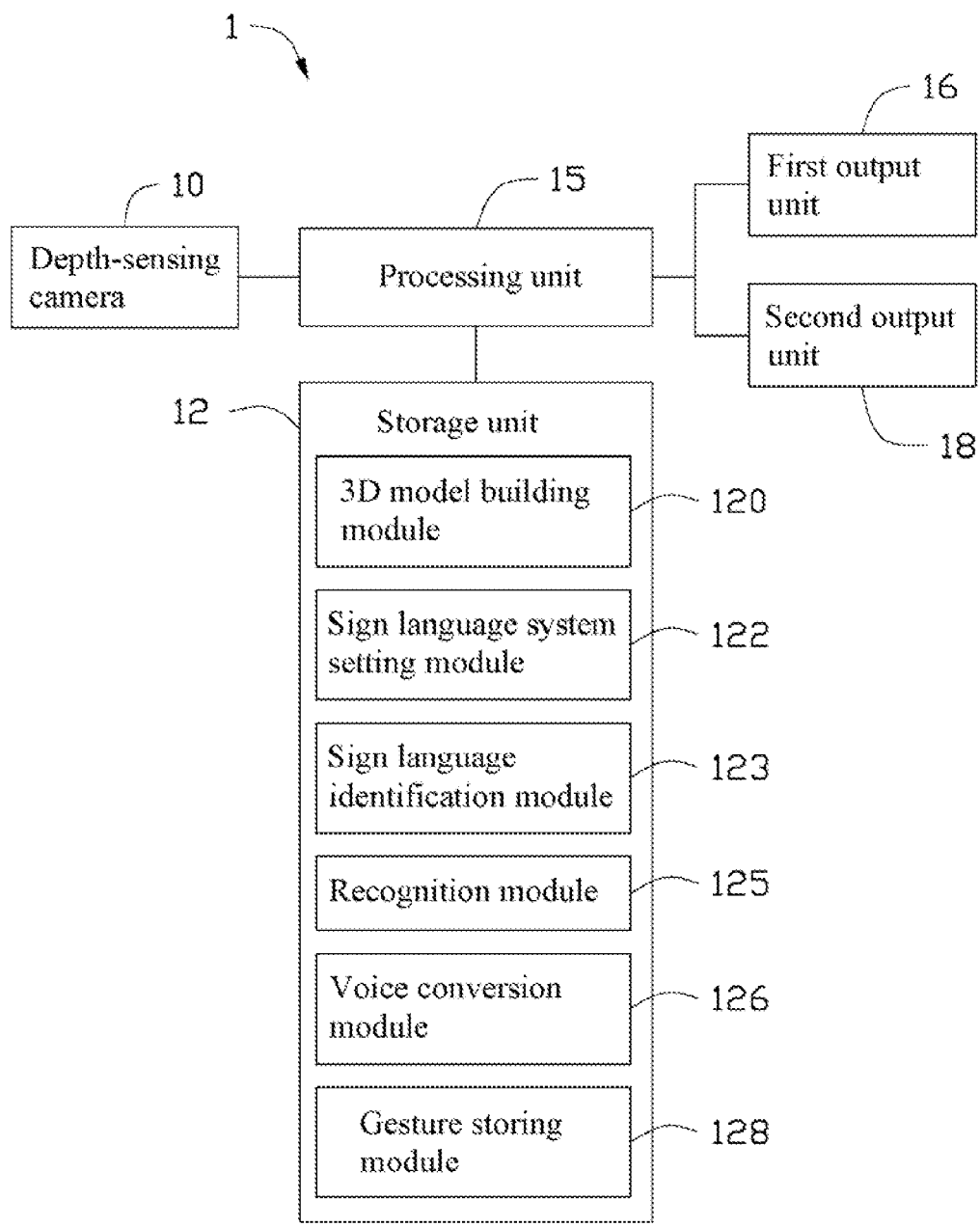
FIG. 1 is a block diagram of an exemplary embodiment of a sign language recognition system.

Referring to FIG. 1, an exemplary embodiment of a sign language recognition system 1 includes a depth-sensing camera 10, a storage unit 12, a processing unit 15, a first output unit 16, and a second output unit 18. In the embodiment, the first output unit 16 is a screen, and the second output unit 18 is a speaker or an earphone. Hereinafter the term signer is used for the person who uses sign language to communicate.

In the embodiment, the depth-sensing camera 10 is a time of flight (TOF) camera. The TOF camera captures an image of the gesture of a signer in the line of sight of the TOF camera, and gathers data as to the distance(s) between a plurality of points on the signer and the TOF camera (which is called distance data hereinafter). The processing unit 15 and the storage unit 12 process the images and the distance data obtained by the depth-sensing camera 10, for obtaining signs from the gestures of the signer.

The TOF camera is a camera system that creates distance data between a plurality of points and the TOF camera. When the TOF camera shoots a scene in the line of sight of the TOF camera, the TOF camera sends radio frequency (RF) signals. The RF signals are reflected back to the TOF camera when the RF signals meet an object, such as the signer in the scene. As a result, the distance data can be obtained according to time differences between sending and receiving the RF signals of the TOF camera.

The storage unit 12 includes a three dimensional (3D) model building module 120, a sign language system setting module 122, a sign language identification module 123, a recognition module 125, a voice conversion module 126, and a gesture storing module 128. The 3D model building module 120, the sign language system setting module 122, the sign language identification module 123, the recognition module 125, and the voice conversion module 126 may include one or more computerized instructions executed by the processing unit 15.

The gesture storing module 128 stores 3D models of different types of gestures and representations for each 3D model. Each type of gestures includes a plurality of gestures. In the embodiment, the gesture storing module 128 stores 3D models of two types of gestures. A first type of gestures corresponds to Chinese Sign Language. A second type of gestures corresponds to American Sign Language. In other embodiments, the gesture storing module 128 may store 3D models of more than two types of gestures or just one type of gestures.

The 3D model building module 120 builds a 3D model of the gesture of the signer according to the image captured by the depth-sensing camera 10 and the data about distances between a plurality of points in the scene and the depth-sensing camera 10. In the embodiment, according to the data regarding distances between a plurality of points in the scene and the depth-sensing camera 10, the points in the scene have coordinates relative to the depth-sensing camera 10. The 3D model building module 120 can obtain a 3D mathematical model according to the coordinates of the points and the image. The 3D mathematical model can be regarded as the 3D model of the gesture of the signer.

The sign language system setting module 122 sets a work mode of the sign language recognition system 1. Work mode hereinafter is referring to which language of sign that the signer is using. It can be understood that in the embodiment, the work modes of the sign language recognition system 1 includes a first mode corresponding to the first type of gesture, and a second mode corresponding to the second type of gesture. In the embodiment, receivers can use two buttons to manually set the work mode of the sign language recognition system 1.

The sign language system identification module 123 automatically sets the work mode of the sign language recognition system 1 when the receivers do not manually set the work mode of the sign language recognition system 1. Automatically set the work mode of the sign language recognition system 1 by the sign language identification module 123 will be described as follows.

The sign language identification module 123 compares the 3D model of the gesture obtained by the 3D model building module 120 with the plurality of 3D models of different types of gestures, to determine which type the 3D model of the gesture obtained belongs to. If the 3D model of the gesture obtained by the 3D model building module 120 belongs to the first type of gesture, the sign language identification module 123 sets the work mode of the sign language recognition system 1 as the first work mode. Moreover, if a 3D model of the gesture obtained by the 3D model building module 120 belongs to both the first and second types of gesture, the sign language identification module 123 may compare the 3D model of the next gesture obtained by the 3D model building module 120 with the plurality of 3D models of different types of gestures, until it is determined which one type the gesture belongs to.

The recognition module 125 compares the 3D model of the gesture obtained by the 3D model building module 120 with the plurality of 3D models of gestures, corresponding to the work mode of the sign language recognition system 1, to find out what the representations of the gesture are. The first output unit 16 displays the representations obtained by the recognition module 125.

The voice conversion module 126 converts the 3D model of the gesture obtained by the 3D model building module 120 into audible sounds. The second output unit 18 plays the representations of the 3D model of the gesture obtained by the 3D model building module 120.

Figure 2:
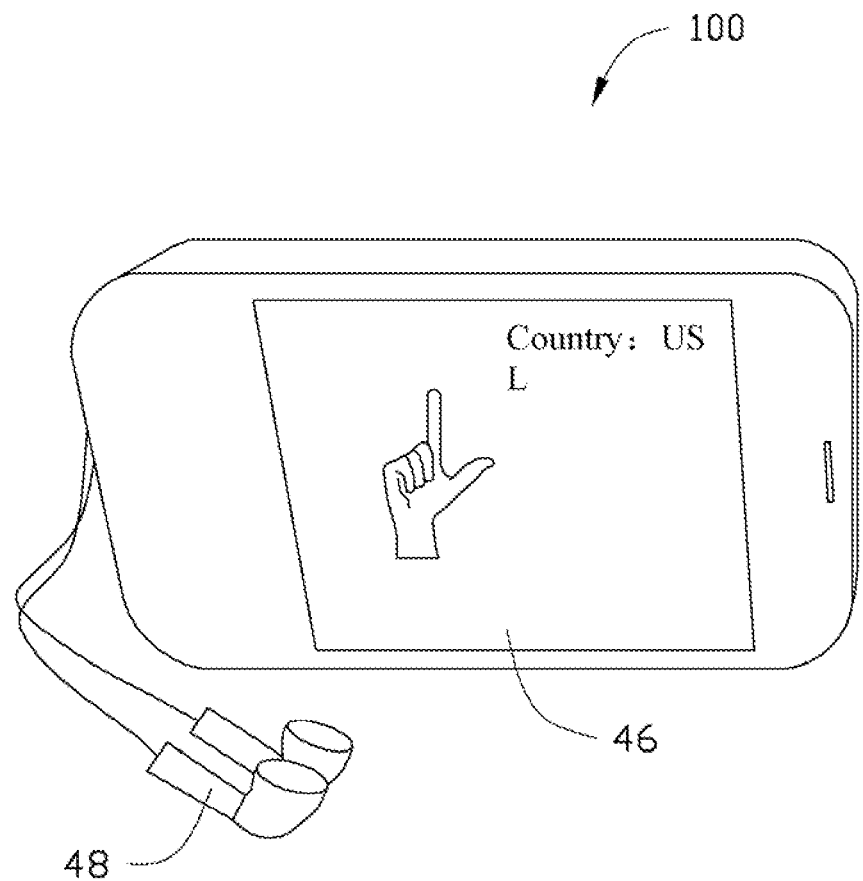
FIG. 2 is a schematic view of the sign language recognition system of FIG. 1.
Figure 3:
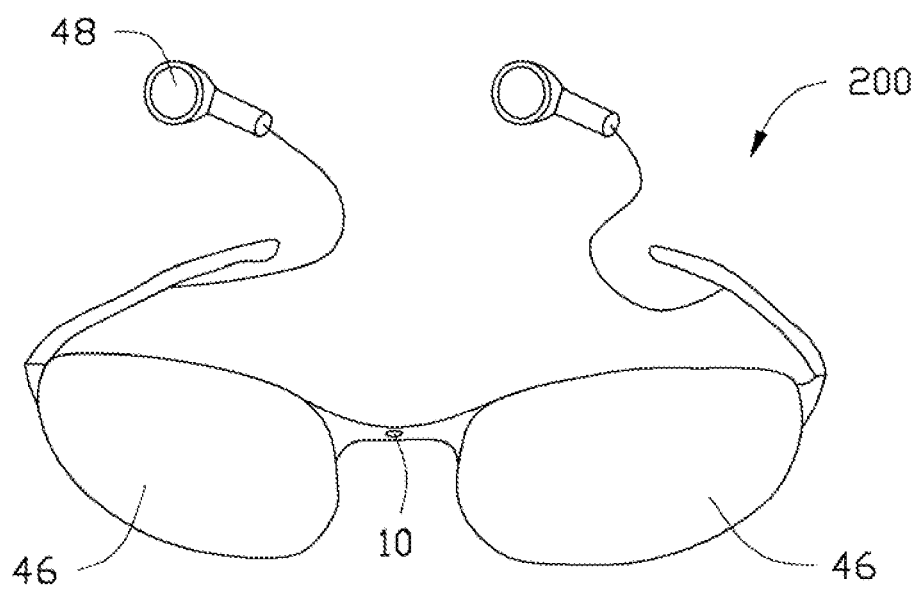
FIG. 3 is another schematic view of the sign language recognition system of FIG. 1.

As shown in FIG. 2, the sign language recognition system 1 may be embedded within a mobile telephone 100. The depth-sensing camera 10 mounts on a surface of the body of the mobile telephone 100. The first output unit 16 is a screen 46 of the mobile telephone 100. The second output unit 18 is an earphone 48 of the mobile telephone 100. Furthermore, the sign language recognition system 1 may take the form of glasses 200 worn by the receiver as shown in FIG. 3. The depth-sensing camera 10 can be mounted on the nose bridge of the glasses 200. The first output unit 16 is two glasses 46 of the glasses 200. The second output unit 18 is an earphone 48 which is connected to the bridge of the glasses 200.

Figure 4:
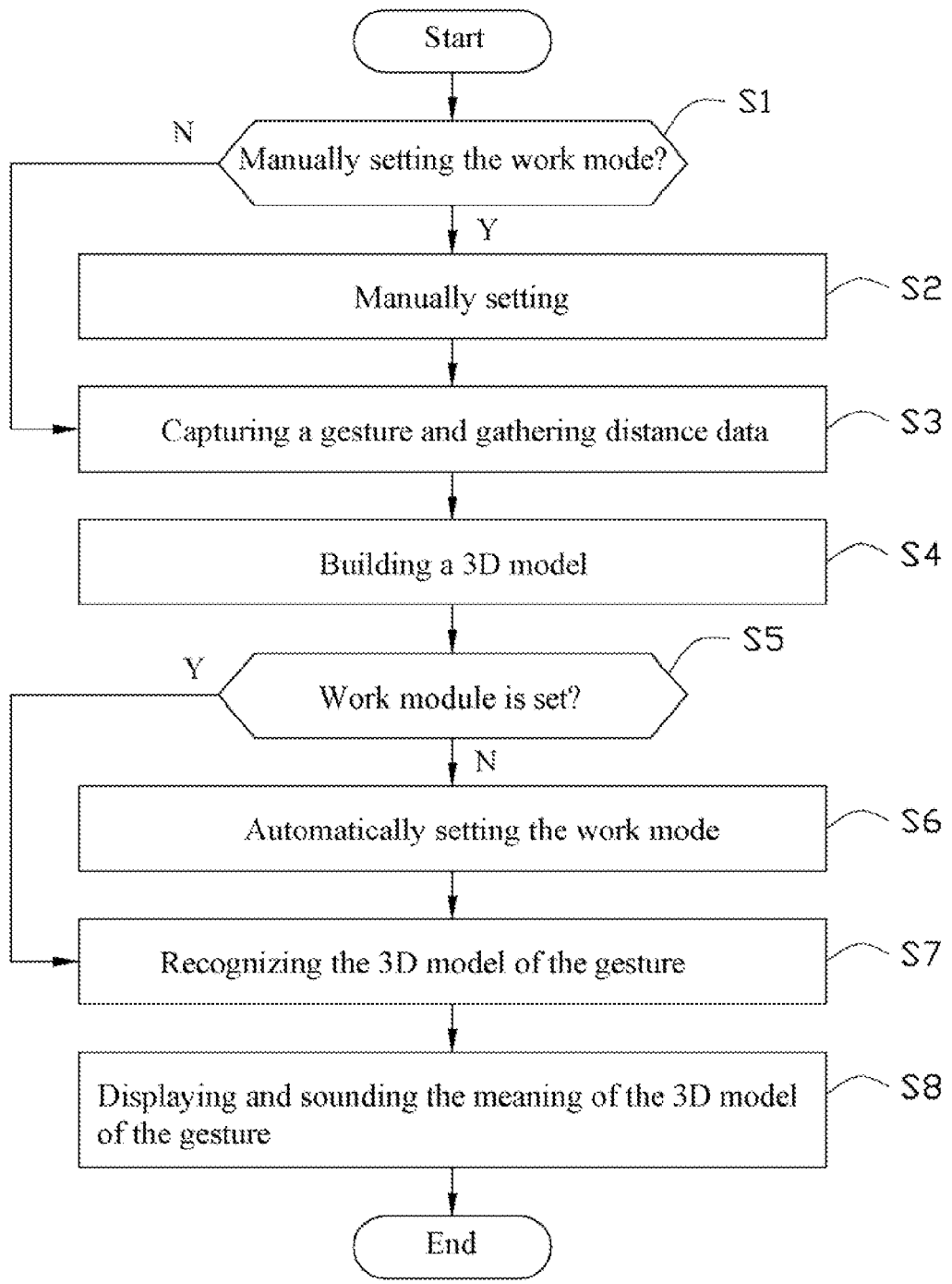
FIG. 4 is a flowchart of an exemplary embodiment of a sign language recognition method.

Referring to FIG. 4, an exemplary embodiment of a sign language recognition method is as follows. Depending on the embodiment, certain of the steps described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

In step S1, the receiver determines whether the receiver needs to manually set the work mode of the sign language recognition system 1. If the receiver needs to manually set the work mode of the sign language recognition system 1, the process flows to step S2. If the receiver does not need to manually set the work mode of the sign language recognition system 1, the process flows to step S3.

In step S2, the receiver manually sets the work mode of the sign language recognition system 1, then the process flows to step S3.

In step S3, the depth-sensing camera 10 captures an image of a gesture of the signer, and gathers data as to the distance(s) between a plurality of points on the signer and the depth-sensing camera 10.

In step S4, the 3D model building module 120 builds a 3D model of the gesture of the signer according to the image captured by the depth-sensing camera 10 and the data about distances between a plurality of points in the scene and the depth-sensing camera 10.

In step S5, the recognition module 125 determines whether the work mode is set. If the work mode is not set, the process flows to step S6. If the work mode is set, the process flows to step S7.

In step S6, the sign language identification module 123 compares the 3D model of the gesture obtained by the 3D model building module 120 with the plurality of 3D models of different types of gestures, to determine which type the gesture of the signer belongs to, and sets the work mode accordingly, then the process flows to step S7. For example, if the 3D model of the gesture obtained by the 3D model building module 120 belongs to the first type of gestures, the sign language identification module 123 sets the work mode of the sign language recognition system 1 as the first work mode. Moreover, if a 3D model of the gesture obtained by the 3D model building module 120 belongs to both the first and second types of gestures, the sign language identification module 123 may compare the 3D model of the next gesture obtained by the 3D model building module 120 with the plurality of 3D models of different types of gestures, until a determination is made which type the gesture belongs to.

In step S7, the recognition module 125 compares the 3D model obtained by the 3D model building module 120 with the plurality of 3D models, corresponding to the work mode of the sign language recognition system 1, to recognize what meanings are associated with the 3D model of the gesture obtained by the 3D model building module 120.

In step S8, the screen 16 displays the meanings obtained by the recognition module 125, the voice conversion module 126 converts the meanings of the 3D model of the gesture obtained by the 3D model building module 120 into audible sounds, and the speaker 18 plays the sounds of the 3D model of the gesture obtained by the 3D model building module 120.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A sign language recognition system comprising:
   a depth-sensing camera to capture an image of a gesture of a signer in a line of sight of the depth-sensing camera, and gather data as to distances between a plurality of points on the signer and the depth-sensing camera;
   a processing unit;
   a storage unit connected to the processing unit and the depth-sensing camera, and storing a plurality of programs to be executed by the processing unit, wherein the storage unit comprises:
   a three dimension (3D) model building module to build a 3D model of the gesture according to the image of the gesture and the data about distances between the plurality of points in the scene and the depth-sensing camera;
   a gesture storing module storing a plurality of 3D models of gestures and representations for each 3D model; and
   a recognition module to compare the 3D model of the gesture obtained with the plurality of 3D models of gestures, to recognize the representations of the 3D model; and
   an output unit connected to the processing unit, to output the representations of the 3D model of the gesture;
   wherein the storage unit further comprises a voice conversion module to convert the representations of the 3D model of the gesture obtained by the 3D model building module into audible sounds; the output unit is a speaker to play the representations of the 3D model of the gesture obtained by the 3D model building module.

2. The system of claim 1, wherein the plurality of 3D models of gestures stored in the gesture storing module comprises a plurality of types of gestures, each type of gestures corresponds to a work mode, and comprises a plurality of 3D models of gestures; the storage unit further comprises a sign language system setting module to manually set the work mode, and the recognition module compares the 3D model of the gesture obtained by the 3D model building module with the plurality of 3D models of gestures belonged to a type of gestures corresponding to the work mode, to recognize the representations of the 3D model of the gesture.

3. The system of claim 1, wherein the plurality of 3D models of gestures stored in the gesture storing module comprises a plurality of types of gestures, each type of gestures corresponds to a work mode, and comprises a plurality of gestures; the storage unit further comprises a sign language identification module to compare the 3D model of the gesture obtained by the 3D model building module with the plurality of 3D models of gestures, to determine which type the 3D module of the gesture belongs to, and correspondingly set the work mode; the recognition module compares the 3D module of the gesture obtained by the 3D model building module with the plurality of 3D models of gestures belonged to one type of gestures corresponding to the work mode, to find out the representations of the 3D model of the gesture.

4. The system of claim 3, wherein if a 3D model of gesture of the signer obtained by the 3D model building module belongs to two or more types of gestures, the sign language identification module then compares a 3D model of a next gesture of the signer obtained by the 3D model building module with the plurality of 3D models of different types of gestures, to determine which type the 3D model of the gesture belongs to.

5. The system of claim 1, wherein the output unit is a screen to display the representations of the 3D model of the gesture obtained by the 3D model building module.

6. The system of claim 1, wherein the storage unit further comprises a voice conversion module to convert the representations of the 3D model of the gesture obtained by the 3D model building module into audible sounds; the output unit is an earphone to play the representations of the 3D model of the gesture obtained by the 3D model building module.

7. A sign language recognition method comprising:
capturing an image of a gesture of a signer and gathering data about distances between a plurality of points on the signer and a depth-sensing camera by the depth-sensing camera;
building a three dimension (3D) model of the gesture according to the image and the data about distances;
comparing the 3D model of the gesture with a plurality of 3D models of gestures to find out the representations of the 3D model of the gesture; and outputting the representations of the 3D model of the gesture;
wherein the storage unit further comprises a voice conversion module to convert the representations of the 3D model of the gesture obtained by the 3D model building module into audible sounds; the output unit is a speaker to play the representations of the 3D model of the gesture obtained by the 3D model building module.

8. The method of claim 7, wherein between the step "building a three dimension (3D) model of the gesture according to the image and the data about distances" and the step "comparing the 3D model of the gesture with a plurality of 3D models of gestures to find out the representations of the 3D model of the gesture", further comprising:
determining whether to set a work mode manually; and
setting the work mode manually upon the condition that the work mode needs to be set manually.

9. The method of claim 8, further comprising:
comparing the 3D model of the gesture of the signer obtained with a plurality of 3D models of different types of gestures, to determine which type the 3D model of the gesture of the signer belongs to, and correspondingly set the work mode, upon the condition that the work mode does not need to be set manually.

10. The method of claim 8, wherein the step "outputting the representations of the 3D model of the gesture" comprises:
displaying the representations of the 3D model of the gesture by a screen.

11. The method of claim 8, wherein the step "outputting the representations of the 3D model of the gesture" comprises:
outputting the representations of the 3D model of the gesture by a speaker or an earphone.

* * * * *